(12) United States Patent
Zheng et al.

(10) Patent No.: US 9,129,100 B2
(45) Date of Patent: Sep. 8, 2015

(54) VERIFICATION CODE GENERATION AND VERIFICATION METHOD AND APPARATUS

(71) Applicant: Huawei Technologies Co., Ltd., Shenzhen (CN)

(72) Inventors: Jiangzhen Zheng, Nanjing (CN); Li Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/079,910

(22) Filed: Nov. 14, 2013

(65) Prior Publication Data

US 2014/0173713 A1    Jun. 19, 2014

Related U.S. Application Data

(63) Continuation of application No. PCT/CN2013/079789, filed on Jul. 22, 2013.

(30) Foreign Application Priority Data

Dec. 13, 2012   (CN) .......................... 2012 1 0538689

(51) Int. Cl.
G06F 7/04 (2006.01)
G06F 17/00 (2006.01)
(Continued)

(52) U.S. Cl.
CPC .............. *G06F 21/31* (2013.01); *G06F 3/0488* (2013.01); *G06F 21/36* (2013.01)

(58) Field of Classification Search
CPC ........ G06F 21/31; G06F 21/36; G06F 3/0412
USPC ...................................................... 726/16, 1
See application file for complete search history.

(56) References Cited

U.S. PATENT DOCUMENTS

2003/0210127 A1* 11/2003 Anderson ..................... 340/5.27
2006/0119582 A1*  6/2006 Ng et al. ........................ 345/168
(Continued)

FOREIGN PATENT DOCUMENTS

| CN | 101261669 A | 9/2008 |
| CN | 101895542 A | 11/2010 |
| CN | 102360409 A | 2/2012 |

OTHER PUBLICATIONS

Foreign Communication From a Counterpart Application, PCT Application No. PCT/CN2013/079789, Chinese Search Report dated Oct. 31, 2013, 7 pages.

(Continued)

*Primary Examiner* — Abu Sholeman
(74) *Attorney, Agent, or Firm* — Conley Rose, P.C.; Grant Rodolph; Nicholas K. Beaulieu

(57) ABSTRACT

The present invention discloses a verification code generation and verification method, including: displaying a verification code display region on a touch display module, where the verification code display region includes at least one user-recognizable verification code element; sensing a touch action of a user on the touch display module, and determining a position of the touch action on the touch display module; and comparing whether the position of the touch action of the user on the touch display module is the same as a position of the verification code element to determine whether a verification code is correctly input. The verification code generation and verification method in the embodiments of the present invention is convenient for the user to input a verification code for verification, and brings a good verification effect while facilitating operations. Further, the present invention discloses a verification code generation and verification apparatus.

20 Claims, 8 Drawing Sheets

(51) Int. Cl.
*G06F 21/31* (2013.01)
*G06F 21/36* (2013.01)
*G06F 3/0488* (2013.01)

(56) References Cited

U.S. PATENT DOCUMENTS

| | | | |
|---|---|---|---|
| 2007/0005967 A1* | 1/2007 | Mister et al. | 713/168 |
| 2010/0194690 A1* | 8/2010 | Wilairat | 345/168 |
| 2010/0321304 A1* | 12/2010 | Rofougaran | 345/173 |
| 2011/0202981 A1* | 8/2011 | Tamai et al. | 726/6 |
| 2012/0174213 A1* | 7/2012 | Geiger et al. | 726/19 |
| 2012/0264516 A1* | 10/2012 | Rudchenko et al. | 463/36 |
| 2013/0326604 A1* | 12/2013 | Hird | 726/7 |
| 2014/0109049 A1* | 4/2014 | Kaulgud et al. | 717/123 |

OTHER PUBLICATIONS

Foreign Communication From a Counterpart Application, PCT Application No. PCT/CN2013/079789, Chinese Written Opinion dated Oct. 31, 2013, 5 pages.

* cited by examiner

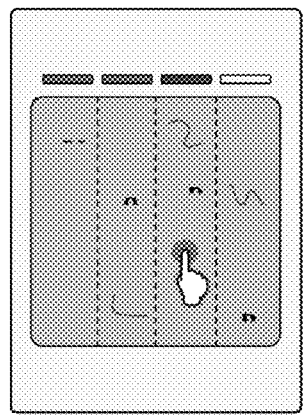 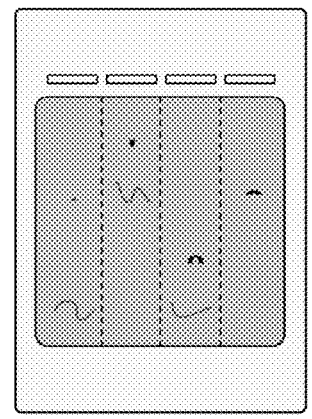
FIG. 2C  FIG. 2D
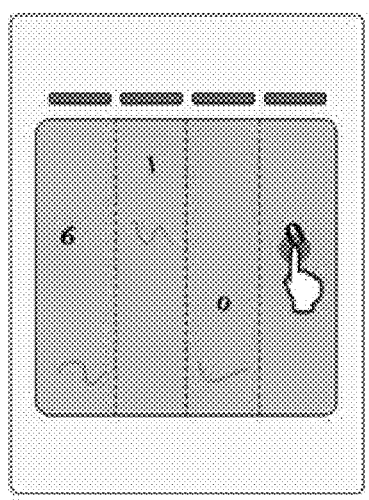 
FIG. 2E  FIG. 2F

VERIFICATION CODE GENERATION AND VERIFICATION METHOD AND APPARATUS

CROSS-REFERENCE TO RELATED APPLICATIONS

This application is a continuation of International Application No. PCT/CN2013/079789, filed on Jul. 22, 2013, which claims priority to Chinese Patent Application No. 201210538689.4, filed Dec. 13, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a verification code generation and verification method and apparatus.

BACKGROUND

A verification code is a public full-automatic program for distinguishing whether an access requester is a computer program or a person. The verification code is usually used to prevent malicious programs such as Trojans from cracking a password, casting votes repeatedly, bumping in a forum, and so on, in order to prevent a certain hacker from making persistent login attempts by using a specific program to crack certain registered users violently or the like. The verification code is generally composed of lines and irregular characters, and is primarily intended to prevent a hacker from making a password into data and stealing the password. Currently, mainstream verification codes have the following forms:

1. A verification code is composed of only digits and letters, which may be all letters or all digits, and is a random string of a plurality of bits. This type of verification code is the most original, and its verification effect is almost zero in the current technical environment.

2. A verification code is an image verification code consisting of random digits+random uppercase letters+random interfering pixels+random positions+random length. The verification code is randomly generated, relatively secure, but difficult for verification and inconvenient for a user to input.

3. An advertisement verification code: a part of the content in an advertisement is input, which can bring additional revenues to a website and is also refreshing to the user.

4. A question verification code: a verification code is input mainly in a question-and-answer manner.

The above technologies have many disadvantages. First, every time after inputting a username and a password, the user has to switch to a keyboard to input characters. Especially, if the user needs to input characters on a touchscreen, the process is rather complicated, which brings poor user experience and is troublesome to the user. Secondly, a verification code usually includes stacked texts and is user-unrecognizable, which forces the user to keep refreshing the verification code image. Thirdly, a verification code is input to prevent attacks from malicious programs and keep a server system in secure state, but in practice, it mostly prevents the user from using the service pleasantly, causes troubles to the user, and brings no significant improvement to security.

SUMMARY

Embodiments of the present invention provide a verification code generation and verification method and apparatus, which is convenient for a user to input a verification code for verification, and bring a good verification effect while facilitating operations.

In a first aspect, an embodiment of the present invention discloses a verification code generation and verification method, including: displaying a verification code display region on a touch display module, where the verification code display region includes at least one user-recognizable verification code element; sensing a touch action of a user on the touch display module, and determining a position of the touch action on the touch display module; and comparing whether the position of the touch action of the user on the touch display module is the same as a position of the verification code element to determine whether a verification code is correctly input.

The verification code generation and verification method in the embodiment of the present invention is convenient for the user to input a verification code for verification, and brings a good verification effect while facilitating operations.

In a first possible implementation manner of the first aspect of the present invention, the displaying a verification code display region on a touch display module includes: selecting an initial verification code region on the touch display module according to a preset parameter; dividing the initial verification code region into at least two sub-regions according to a preset rule; generating a user-recognizable verification code element in a random position in each of the at least two sub-regions to form the verification code display region, and storing the position of the user-recognizable verification code element in a corresponding sub-region; and correspondingly, the comparing whether the position of the touch action of the user on the touch display module is the same as the position of the verification code element to determine whether a verification code is correctly input, specifically includes: comparing whether the position of the touch action of the user on the touch display module is the same as the position of the user-recognizable verification code element in the corresponding sub-region to determine whether the verification code is correctly input.

With reference to any one of the foregoing embodiments, in a second possible implementation manner of the first aspect of the present invention, after the displaying a verification code display region on a touch display module, where the verification code display region includes at least one user-recognizable verification code element, the method further includes: displaying a verification code prompt region on the touch display module, and displaying a selection rule correlated with the verification code element in the verification code prompt region, where the selection rule is used to prompt the user to select the verification code element in the verification code display region according to the selection rule; in addition to the sensing the touch action of the user on the touch display module and determining the position of the touch action on the touch display module, the method further includes: recording an input rule of the user; and correspondingly, in addition to the comparing whether the position of the touch action of the user on the touch display module is the same as the position of the verification code element, the method further includes: comparing whether the input rule of the user is the same as the selection rule displayed in the verification code prompt region to determine whether the verification code is correctly input.

With reference to any one of the foregoing embodiments, in a third possible implementation manner of the first aspect of the present invention, the verification code element is any one of three elements: text, color, and image, or a combination of any two of the three elements, or a combination of the three elements.

With reference to any one of the foregoing embodiments, in a fourth possible implementation manner of the first aspect of the present invention, a shape of the sub-region is any one of four shapes: triangle, quadrangle, circle, and cuboid, or a combination of at least two of the four shapes.

With reference to any one of the foregoing embodiments, in a fifth possible implementation manner of the first aspect of the present invention, the selection rule includes semantic representation, pictographic representation, and logical representation correlated with each selected verification code element, and a selection order of each verification code element.

In a second aspect, an embodiment of the present invention discloses a verification code generation and verification apparatus, where the apparatus includes: a displaying module configured to display a verification code display region on a touch display apparatus, where the verification code display region includes at least one user-recognizable verification code element; a position determining module configured to sense a touch action of a user on the touch display apparatus, and determine a position of the touch action on the touch display apparatus; and a judging module configured to compare whether the position of the touch action of the user on the touch display apparatus, which is obtained by the position determining module, is the same as a position of the verification code element, which is displayed by the displaying module, so as to determine whether a verification code is correctly input.

The verification code generation and verification apparatus in the embodiment of the present invention is convenient for the user to input a verification code for verification, and brings a good verification effect while facilitating operations.

In a first possible implementation manner of the second aspect, the displaying module includes: a selecting unit configured to select an initial verification code region on the touch display apparatus according to a preset parameter; a sub-region dividing unit configured to divide the initial verification code region, which is selected by the selecting unit, into at least two sub-regions according to a preset rule; a verification code generating unit configured to generate a user-recognizable verification code element in a random position in each of the at least two sub-regions to form the verification code display region, where the two sub-regions are a result of dividing by the sub-region dividing unit, and store the position of the user-recognizable verification code element in a corresponding sub-region; and correspondingly, the comparing, by the judging module, whether the position of the touch action of the user on the touch display apparatus is the same as the position of the verification code element to determine whether a verification code is correctly input, specifically includes: comparing, by the judging module, whether the position of the touch action of the user on the touch display apparatus is the same as the position of the user-recognizable verification code element in the corresponding sub-region to determine whether the verification code is correctly input.

With reference to any one of the foregoing embodiments, in a second possible implementation manner of the second aspect of the present invention, the displaying module further includes: a prompting unit configured to display a verification code prompt region on the touch display apparatus, and display a selection rule correlated with the verification code element in the verification code prompt region, where the selection rule is used to prompt the user to select the verification code element in the verification code display region according to the selection rule; in addition to the sensing the touch action of the user on the touch display apparatus and determining the position of the touch action on the touch display apparatus, the position determining module is further configured to record an input rule of the user; and correspondingly, in addition to the comparing whether the position of the touch action of the user on the touch display apparatus is the same as the position of the verification code element, the judging module is further configured to: compare whether the input rule of the user is the same as the selection rule displayed in the verification code prompt region to determine whether the verification code is correctly input.

With reference to any one of the foregoing embodiments, in a third possible implementation manner of the second aspect of the present invention, the verification code element is any one of three elements: text, color, and image, or a combination of any two of the three elements, or a combination of the three elements.

With reference to any one of the foregoing embodiments, in a fourth possible implementation manner of the second aspect of the present invention, a shape of the sub-region is any one of four shapes: triangle, quadrangle, circle, and cuboid, or a combination of at least two of the four shapes.

With reference to any one of the foregoing embodiments, in a fifth possible implementation manner of the second aspect of the present invention, the selection rule includes semantic representation, pictographic representation, and logical representation correlated with each selected verification code element, and a selection order of each verification code element.

Further, an embodiment of the present invention provides a verification code generation and verification apparatus, which includes a central processing unit (CPU) and a memory that stores executable program codes, where the executable codes may be used to: display a verification code display region on a touch display module, where the verification code display region includes at least one user-recognizable verification code element; sense a touch action of a user on the touch display module, and determine a position of the touch action on the touch display module; and compare whether the position of the touch action of the user on the touch display module is the same as a position of the verification code element to determine whether a verification code is correctly input.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2A to FIG. 2F illustrate a specific example of generating and verifying a verification code according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
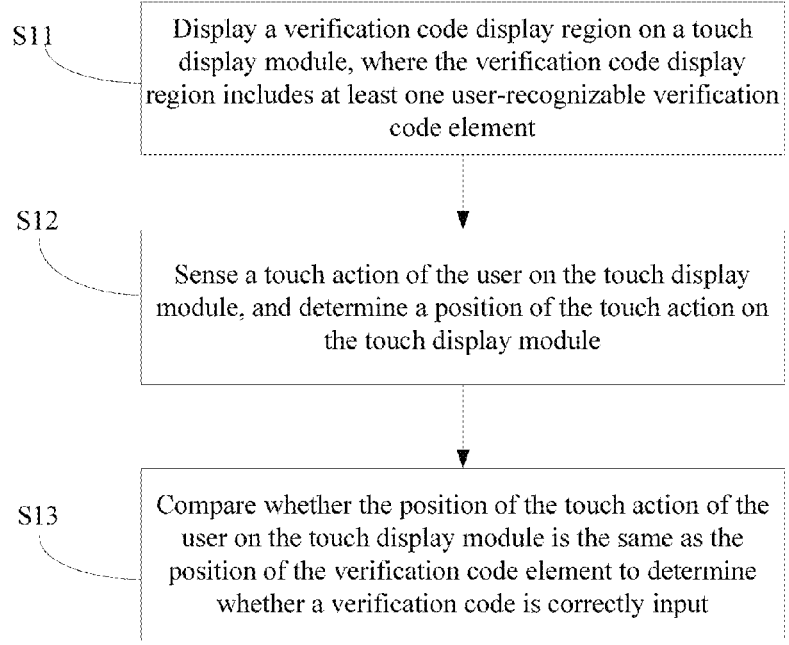
FIG. 1 is a flowchart of a verification code generation and verification method according to an embodiment of the present invention.

With reference to FIG. 1, the following describes a verification code generation and verification method according to an embodiment of the present invention. As shown in FIG. 1, the method includes the following steps:

S11. Display a verification code display region on a touch display module, where the verification code display region includes at least one user-recognizable verification code element.

In an embodiment of the present invention, the verification code element may be any one of three elements: text, color, and image, or a combination of any two of the three elements, or a combination of the three elements. The combination may be random, or may be formed according to preset rules, and the displayed verification code element is user-recognizable.

In an embodiment of the present invention, the displaying a verification code display region on a touch display module includes: selecting an initial verification code region on the touch display module according to a preset parameter; dividing the initial verification code region into at least two sub-regions according to a preset rule; and generating a user-recognizable verification code element in a random position in each of the at least two sub-regions to form the verification code display region, and storing a position of the user-recognizable verification code element in the corresponding sub-region.

Figure 6A:
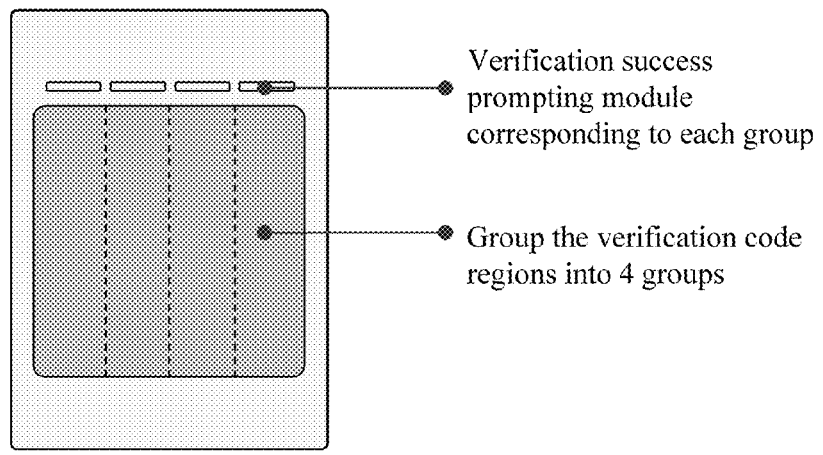
FIG. 6A to FIG. 6C illustrate a specific example of division and shapes of sub-regions according to an embodiment of the present invention.

In an embodiment of the present invention, as shown in FIG. 6A, the initial verification code region may be divided into four sub-regions of an equal size, and above each sub-region there is a prompt region, which can prompt whether a user touch is correct. It can be understood that the number of sub-regions may be another number such as 3, 5, or 6, and the sizes of the sub-regions may also be unequal. It can be understood that the above embodiment is only an example given for helping understand the present invention, and shall not be construed as a limitation on the embodiment of the present invention. Persons of ordinary skill in the art may derive other manners of dividing into sub-regions without creative efforts.

Figure 6B:
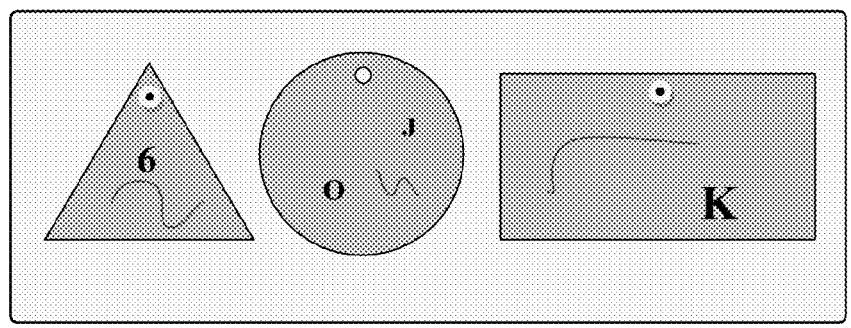
Figure 6C:
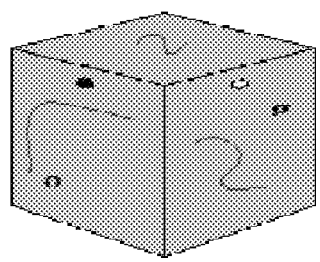

In an embodiment of the present invention, a shape of the sub-region is any one of four shapes: triangle, quadrangle, circle, and cuboid, or a combination of at least two of the four shapes. As shown in FIG. 6B, the shape of the sub-region may be a triangle, a circle or a rectangle. As shown in FIG. 6C, the shape of the sub-region may be a 3-dimensional image. In an embodiment of the present invention, as shown in FIG. 6B to FIG. 6C, a character in a figure represents a verification code element, and irregular lines represent interfering codes, and the interfering codes may be added into the sub-region to increase security of the verification code without affecting a user's normal use.

In an embodiment of the present invention, after the displaying a verification code display region on a touch display module, where the verification code display region includes at least one user-recognizable verification code element, the method further includes: displaying a verification code prompt region on the touch display module, and displaying a selection rule correlated with the verification code element in the verification code prompt region, where the selection rule is used to prompt the user to select the verification code element in the verification code display region according to the selection rule.

In an embodiment of the present invention, the selection rule includes semantic representation, pictographic representation, and logical representation correlated with each selected verification code element, and a selection order of each verification code element. Semantic representation is to indicate the selection rule to the user by using a user-readable sentence, where the sentence may be in English or in another language, for example, "Please select a red cube, a black ball, and a blue star," and so on; pictographic representation is to indicate the selection rule to the user by using an image similar to a verification code element; and logical representation requires the user to perform a logic operation, and, according to an operation result, obtains a verification code element correlated with the selection rule. It can be understood that the selection rule may be expressed in one or several manners correlated with the verification code element. The example here is merely intended to help understand the embodiment of the present invention and shall not be construed as a limitation on the embodiment of the present invention.

Figure 4:
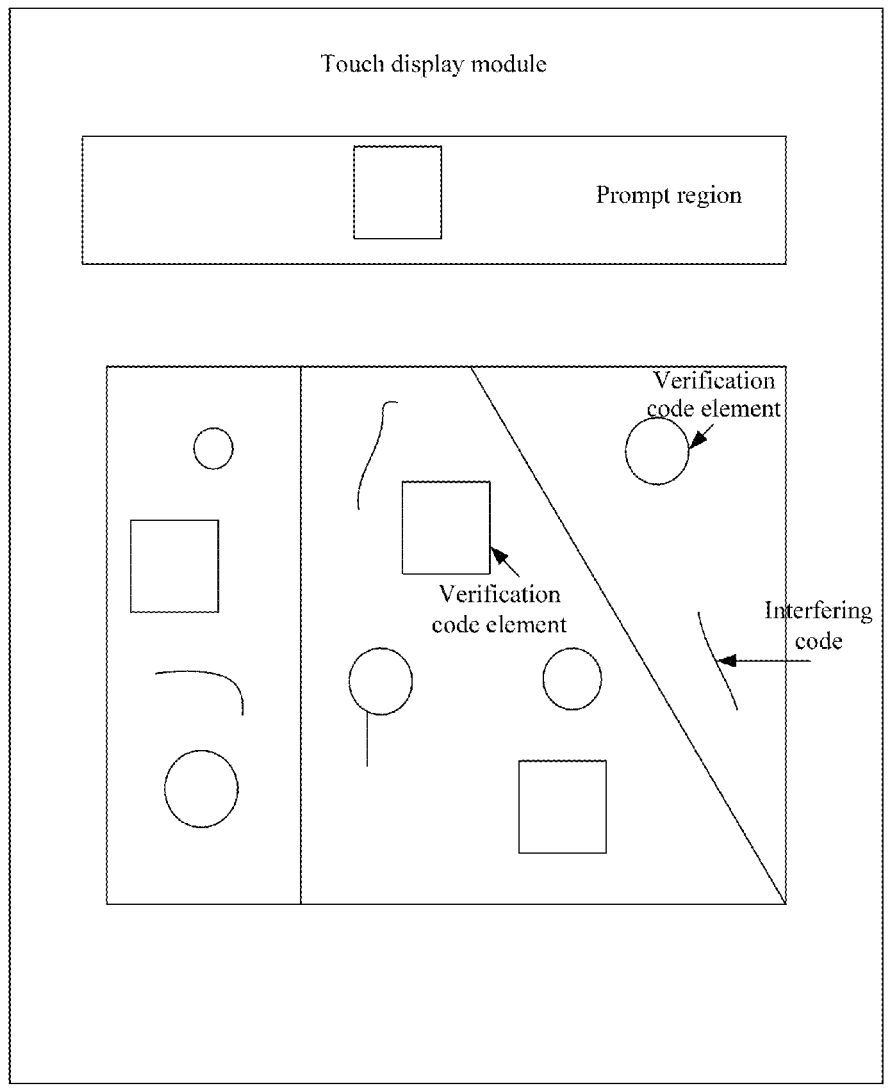
FIG. 4 illustrates a specific example of a verification code prompt region according to an embodiment of the present invention.

FIG. 4 illustrates a specific example of a pictographic representation of a selection rule. As shown in FIG. 4, the element displayed in the prompt region is a quadrangle, and therefore, the user needs to select a quadrangular verification code element in the verification code display region. It can be understood that the above example is merely intended to help understand the embodiment of the present invention and shall not be construed as a limitation on the technical solution of the present invention. Persons of ordinary skill in the art may derive other implementation manners without creative efforts, for example, the element displayed in the prompt region is text, the element displayed in the prompt region is an image, and so on.

Figure 5:
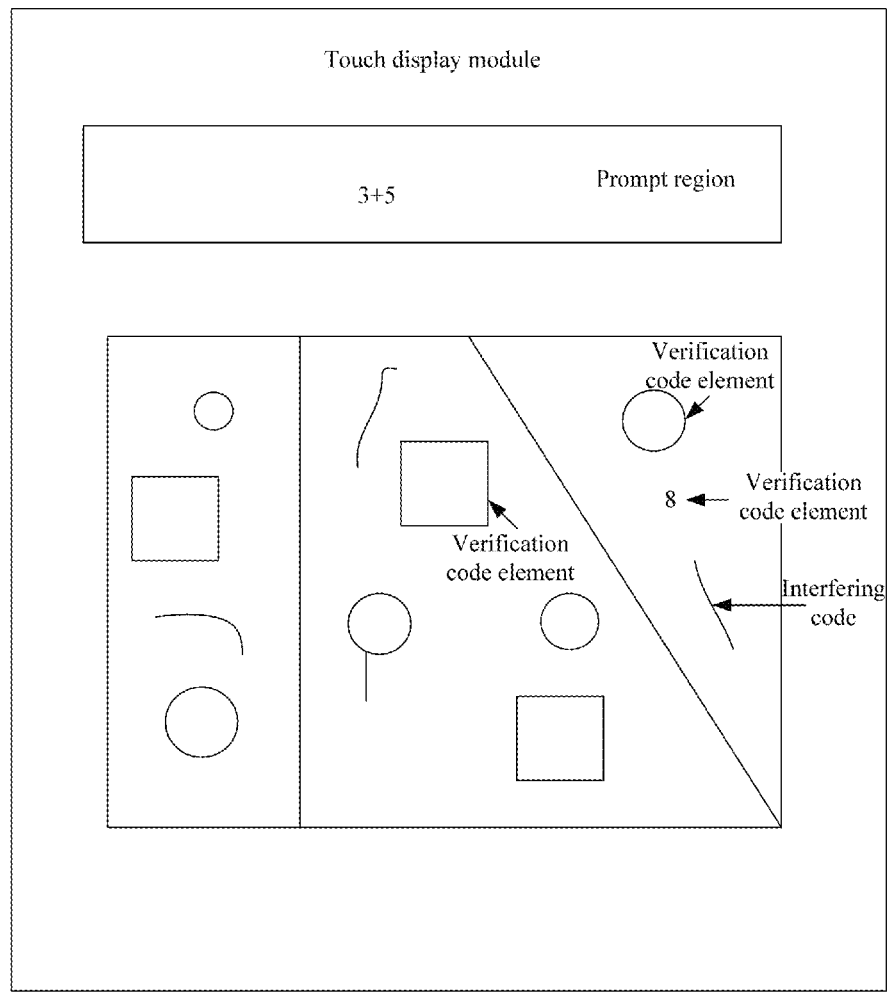
FIG. 5 illustrates another specific example of a verification code prompt region according to an embodiment of the present invention.

FIG. 5 illustrates a specific example of a logical representation of a selection rule. In an embodiment of the present invention, the prompt information is used to prompt the user to perform calculation according to the element displayed in the verification code prompt region, and prompt the user to select the verification code element compliant with a calculation result. As shown in FIG. 5, the element displayed in the prompt region is 3+5, and therefore, the user needs to select a verification code element of the result "8" in the verification code display region. The verification code element may indicate the result directly or indirectly. For example, the verification code element is 4+4. It can be understood that the above example is merely intended to help understand the embodiment of the present invention and shall not be construed as a limitation on the technical solution of the present invention. Persons of ordinary skill in the art may derive other implementation manners without creative efforts, for example, the user is prompted to select a specific color, select a combination of elements such as color, digit, text, and so on, or select a specific state.

S12. Sense a touch action of the user on the touch display module, and determine a position of the touch action on the touch display module.

After triggering the verification, the user needs to perform a touch action on the touch display module. Through the touch action, the user can decide the to-be-selected position discretionarily.

In an embodiment of the present invention, in addition to the sensing the touch action of the user on the touch display module and determining the position of the touch action on the touch display module, the method further includes: recording an input rule of the user, so as to facilitate subsequent judgment in step S13.

S13. Compare whether the position of the touch action of the user on the touch display module is the same as the position of the verification code element to determine whether a verification code is correctly input.

In an embodiment of the present invention, whether the position of the touch action of the user on the touch display module is the same as the position of the user-recognizable verification code element in the corresponding sub-region can be compared to determine whether the verification code is correctly input.

In an embodiment of the present invention, correspondingly, in addition to the comparing whether the position of the touch action of the user on the touch display module is the same as the position of the verification code element, the method further includes: comparing whether the input rule of the user is the same as the selection rule displayed in the verification code prompt region to determine whether the verification code is correctly input.

The verification code generation and verification method in the embodiment of the present invention is convenient for the user to input a verification code for verification, and brings a good verification effect while facilitating operations.

The following describes a verification code flowchart and several specific implementation manners according to an embodiment of the present invention with reference to FIG. 2 to FIG. 3.

Figures 2A, 2B:
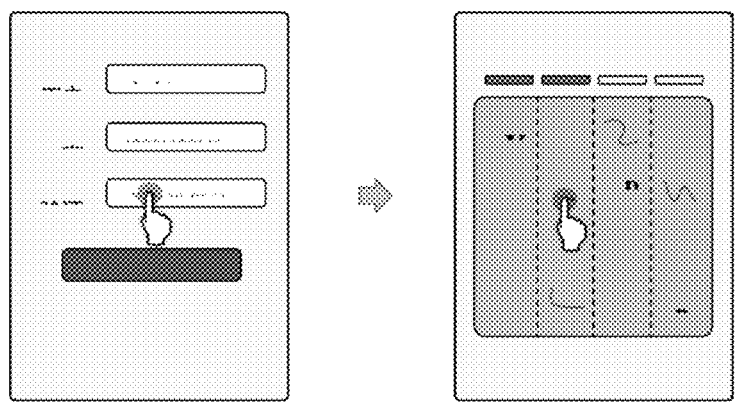

With reference to FIG. 2A to FIG. 2F, the following describes a specific implementation manner of a verification code generation and verification method according to an embodiment of the present invention. As shown in FIG. 2A, a verification code display region and a verification code are generated on the touch display module, the user inputs a username and a password, and then clicks "Verify" to verify the verification code. As shown in FIG. 2B, if a region that includes a verification code element in a verification code system receives a user click or touch signal, the display region on the touch display module in the verification code system displays a corresponding color or text and displays a prompt of being verified as correct to feed back the verification information to the user. As shown in FIG. 2C, if a display region that includes no verification code element in the verification code system receives a user click or touch signal, the verification code system displays an error prompt and, then, after the verification error occurs, the verification code region shown in FIG. 2D is refreshed automatically for the user to start over the verification. The user starts over a touch action on the touch display module. As shown in FIG. 2E to FIG. 2F, after the user performs the touch action again and all verification code elements are verified as correct, the system automatically enters an interface after the verification success for the user to perform subsequent operations.

Figure 3A:
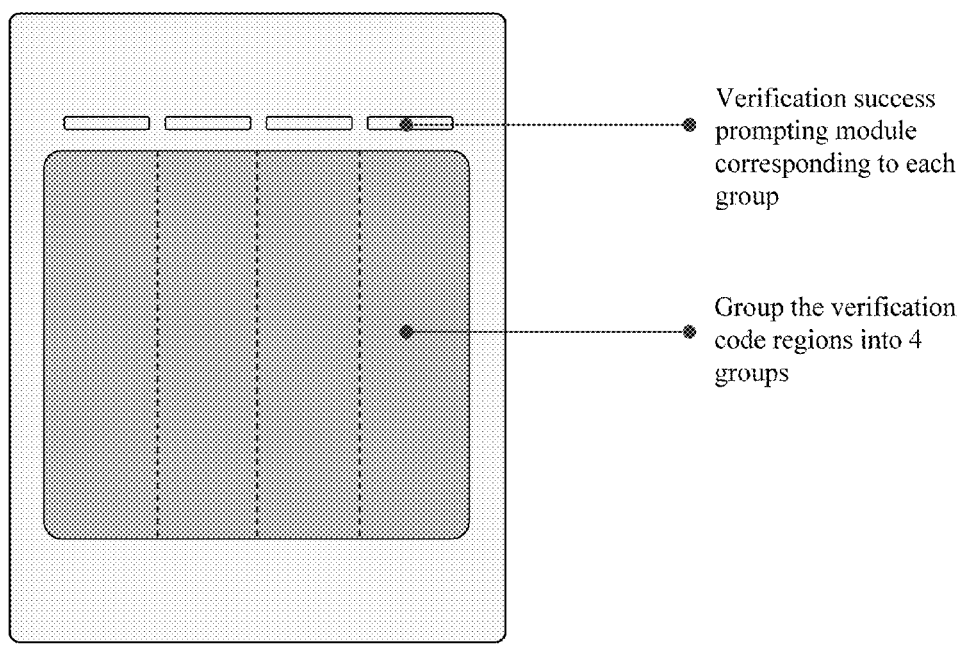
FIG. 3A and FIG. 3B illustrate another specific example of generating and verifying a verification code according to an embodiment of the present invention.
Figure 3B:
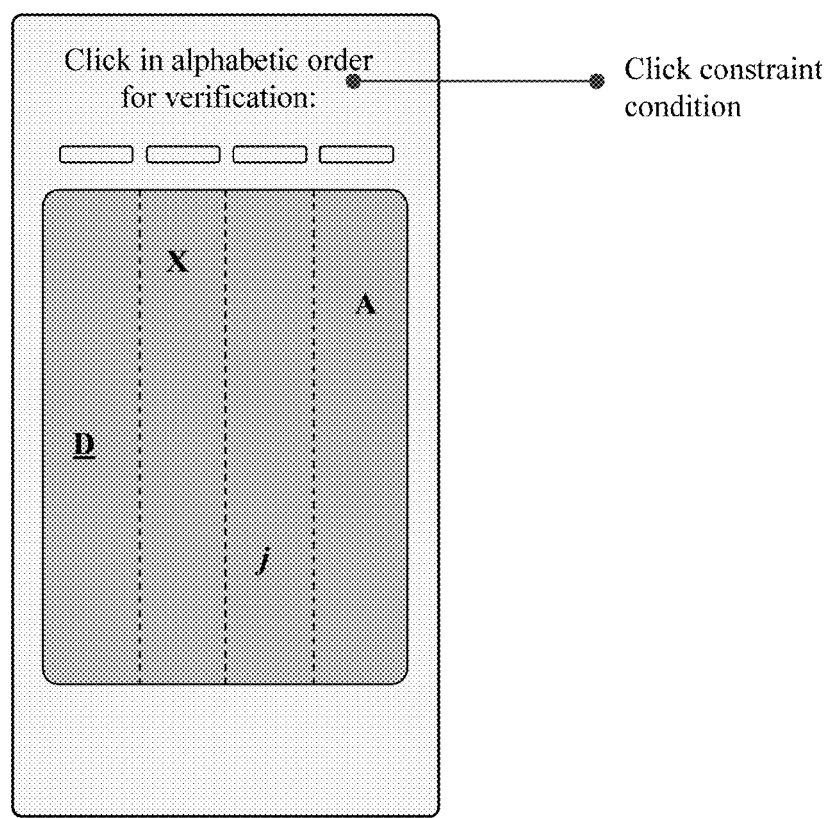

With reference to FIG. 3A and FIG. 3B, the following describes another specific implementation manner of a verification code generation and verification method according to an embodiment of the present invention. The user clicks "Verify," and the system enters a verification code verification window for the user to perform the verification. As shown in FIG. 3A, a verification code generation program groups verification code regions automatically, where each group has a prompt module indicating whether the verification succeeds. The verification code generation program automatically fills a group with texture and characters, where a font, size, color, character type, rotation angle, and position of the characters may change randomly. A verification code image has texture, which prevents a Trojan program from recognizing characters in the image, and the verification code generation program creates many clickable display sub-regions in each group automatically. For places with characters, a clickable region is just available for being clicked by the user without errors, and other display sub-regions may be of unequal sizes.

As shown in FIG. 3B, a prompt region above the verification code region prompts the user to click the verification code elements in alphabetical order, and the user needs to click the verification code element by following a rule determined according to the prompt information, so as to verify a group. In a visual or audible manner, a verification code may feed back whether the current group is verified as correct. If the current group is verified as incorrect, the verification code is refreshed; or, if the verification succeeds, the user continues to click and verify the next group until all groups are verified as correct. After all groups are verified as correct, the system returns to a page after the verification success.

The verification code generation and verification method in the embodiment of the present invention enables the user to input a verification code more quickly and increases the fun of verifying the user verification code. Input by using a touch action makes the input of the verification code no longer a burden for the user. Further, depending on specific requirements in an application scenario, security intensity of verifying the verification code can be changed easily by adding groups, adding clickable hotspot regions in each group, or adding an order of verifying the groups for limitation.

Figure 7:
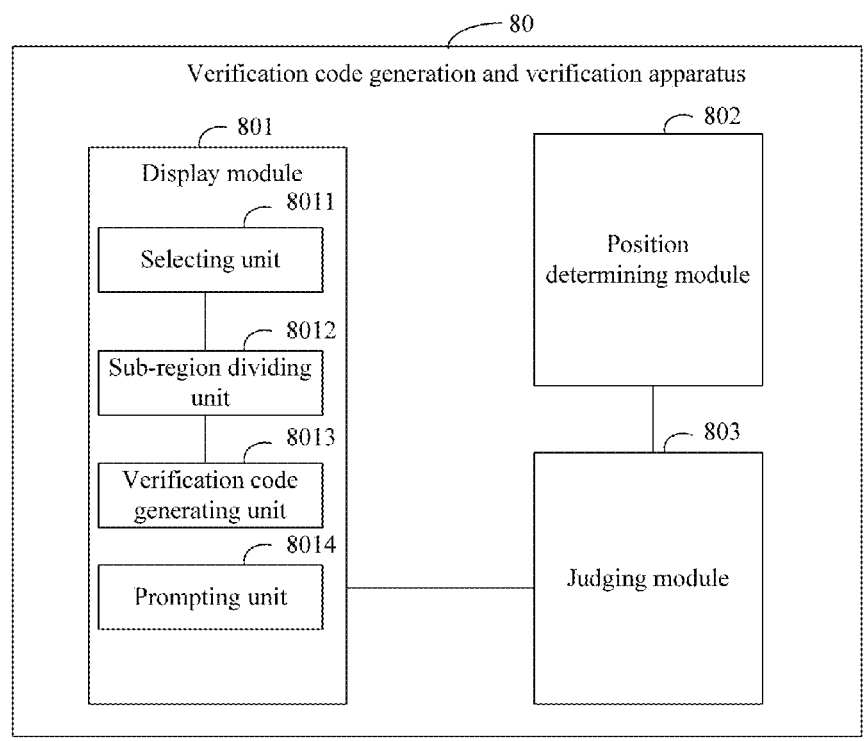
FIG. 7 is a structural diagram of a verification code generation and verification apparatus according to an embodiment of the present invention.

With reference to FIG. 7, the following describes a verification code generation and verification apparatus according to an embodiment of the present invention. The apparatus 80 includes: a displaying module 801 configured to display a verification code display region on a touch display apparatus, where the verification code display region includes at least one user-recognizable verification code element; a position determining module 802 configured to sense a touch action of a user on the touch display apparatus, and determine a position of the touch action on the touch display apparatus; and a judging module 803 configured to compare whether the position of the touch action of the user on the touch display apparatus, which is determined by the position determining module 802, is the same as a position of the verification code element, which is displayed by the displaying module 801, so as to determine whether a verification code is correctly input.

In an embodiment of the present invention, the displaying module 801 includes: a selecting unit 8011 configured to select an initial verification code region on the touch display apparatus according to a preset parameter; a sub-region dividing unit 8012 configured to divide the initial verification code region, which is selected by the selecting unit 8011, into at least two sub-regions according to a preset rule; and a verification code generating unit 8013 configured to generate a user-recognizable verification code element in a random position in each of the at least two sub-regions to form the verification code display region, where the two sub-regions are a result of dividing by the sub-region dividing unit, and store the position of the user-recognizable verification code element in a corresponding sub-region.

Correspondingly, the comparing, by the judging module 803, whether the position of the touch action of the user on the touch display apparatus is the same as the position of the verification code element to determine whether a verification code is correctly input, specifically includes: comparing, by the judging module 803, whether the position of the touch action of the user on the touch display apparatus is the same as the position of the user-recognizable verification code element in the corresponding sub-region to determine whether the verification code is correctly input.

In an embodiment of the present invention, the verification code element is any one of three elements: text, color, and image, or a combination of any two of the three elements, or a combination of the three elements.

In an embodiment of the present invention, a shape of the sub-region is any one of four shapes: triangle, quadrangle, circle, and cuboid, or a combination of at least two of the four shapes.

In an embodiment of the present invention, the displaying module 801 further includes a prompting unit 8014, where the prompting unit 8014 is configured to display a verification code prompt region on the touch display apparatus, and display a selection rule correlated with the verification code element in the verification code prompt region, where the selection rule is used to prompt the user to select the verification code element in the verification code display region according to the selection rule.

In addition to the sensing the touch action of the user on the touch display apparatus and determining the position of the touch action on the touch display apparatus, the position determining module 802 is further configured to record an input rule of the user.

Correspondingly, in addition to the comparing whether the position of the touch action of the user on the touch display apparatus is the same as the position of the verification code element, the judging module 803 is further configured to: compare whether the input rule of the user is the same as the selection rule displayed in the verification code prompt region to determine whether the verification code is correctly input.

In an embodiment of the present invention, the selection rule includes semantic representation, pictographic representation, and logical representation correlated with each selected verification code element, and a selection order of each verification code element.

The verification code generation and verification apparatus 80 in the embodiment of the present invention enables the user to input a verification code more quickly and increases the fun of verifying the user verification code. Input by using a touch action makes the input of the verification code no longer a burden for the user. Further, depending on specific requirements in an application scenario, security intensity of verifying the verification code can be changed easily by adding groups, adding clickable hotspot regions in each group, or adding an order of verifying the groups for limitation.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present invention. The foregoing storage medium includes: any medium that can store program codes, such as a universal serial bus (USB) flash disk, a removable hard disk, a read-only memory (ROM), a random access memory (RAM), a magnetic disc, or an optical disc.

The foregoing descriptions are merely exemplary embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A verification code generation and verification method, comprising:
    displaying a verification code display region on a touch display module, wherein the verification code display region comprises at least one user-recognizable verification code element and a verification code prompt region, wherein the verification code prompt region displays a selection rule correlated with the verification code element, and wherein the verification code prompt region is configured to prompt a user to select the verification code element according to the selection rule;
    sensing a touch action of the user on the touch display module;
    determining a position of the touch action on the touch display module;
    comparing whether the position of the touch action of the user on the touch display module is the same as a position of the verification code element to determine whether a verification code is correctly input; and displaying a user-recognizable verification code element in a random position in each of at least two sub-regions on the touch display module to form the verification code display region, wherein comparing whether the position of the touch action of the user on the touch display module is the same as the position of the verification code element to determine whether the verification code is correctly input comprises comparing whether the position of the touch action on the user on the touch display module is the same as the position on the user-recognizable verification code element in the corresponding sub-region to determine whether the verification code is correctly input.

2. The method according to claim 1, wherein displaying the verification code display region on the touch display module comprises:

selecting an initial verification code region on the touch display module according to a preset parameter;

dividing the initial verification code region into the at least two sub-regions according to a preset rule; and storing the position of the user-recognizable verification code element in a corresponding sub-region.

3. The method according to claim 1, wherein the verification code element comprises: any one of text, color, and image; any combination of two of text, color, and image; or a combination of all three of text, color, and image.

4. The method according to claim 2, wherein the at least two sub-regions comprise at least two different shapes, and wherein the at least two different shapes comprise at least two of a triangle, a quadrangle, a circle, and a cuboid.

5. The method according to claim 1, wherein the selection rule comprises semantic representation, pictographic representation, and logical representation correlated with each selected verification code element and a selection order of each verification code element, wherein the semantic representation indicates the selection rule to the user by using a user-readable sentence, wherein the pictographic representation indicates the selection rule to the user by using an image, and wherein the logical representation indicates the selection rule to the user by describing a logical operation to perform to determine the verification code element.

6. A verification code generation and verification apparatus, comprising:

a non-transitory memory configured to store computer-executable instructions; and a computer processor coupled to the non-transitory memory and configured to execute the computer-executable instruction to:

display a verification code display region on a touch display apparatus, wherein the verification code display region comprises at least one user-recognizable verification code element and a verification prompt region, wherein the verification prompt region displays a selection rule correlated with the verification code element, and wherein the verification code prompt region is configured to prompt a user to select the verification code element according to the selection rule;

sense a touch action of the user on the touch display apparatus and determine a position of the touch action on the touch display apparatus;

compare whether the position of the touch action of the user on the touch display apparatus is the same as a position of the verification code element to determine whether a verification code is correctly input; and display a user-recognizable verification code element in a random position in each of at least two sub-regions to form the verification code display region, wherein comparing whether the position of the touch action of the user on the touch display apparatus is the same as the position of the verification code element to determine whether the verification code is correctly input comprises comparing whether the position of the touch action of the user on the touch display apparatus is the same as the position of the user-recognizable verification code element in the corresponding sub-region to determine whether the verification code is correctly input.

7. The apparatus according to claim 6, wherein the computer processor is further configured to execute the computer-executable instructions to:

select an initial verification code region on the touch display apparatus according to a preset parameter;

divide the initial verification code region into the at least two sub-regions according to a preset rule; and store the position of the user-recognizable verification code element in a corresponding sub-region.

8. The apparatus according to claim 6, wherein the verification code element comprises: any one of text, color, and image; any combination of two of text, color, and image; or a combination of all three of text, color, and image.

9. The apparatus according to claim 7, wherein the at least two sub-regions comprise at least two different shapes, and wherein the at least two different shapes comprise at least two of a triangle, a quadrangle, a circle, and a cuboid.

10. The apparatus according to claim 6, wherein the selection rule comprises semantic representation, pictographic representation, and logical representation correlated with each selected verification code element and a selection order of each verification code element, wherein the semantic representation indicates the selection rule to the user by using a user-readable sentence, wherein the pictographic representation indicates the selection rule to the user by using an image, and wherein the logical representation indicates the selection rule to the user by describing a logical operation to perform to determine the verification code element.

11. A non-transitory computer-readable medium having computer usable instructions stored thereon for execution by a processor, wherein the instructions cause the processor to:

display a verification code display region on a touch display module, wherein the verification code display region comprises at least one user-recognizable verification code element and a verification code prompt region, wherein the verification code prompt region displays a selection rule correlated with the verification code element, and wherein the verification code prompt region is configured to prompt a user to select the verification code element according to the selection rule;

sense a touch action of a user on the touch display module;

determine a position of the touch action on the touch display module;

compare whether the position of the touch action of the user on the touch display module is the same as a position of the verification code element to determine whether a verification code is correctly input; and display a user-recognizable verification code element in a random position in each of at least two sub-regions to form the verification code display region, wherein comparing whether the position of the touch action of the user on the touch display module is the same as the position of the verification code element to determine whether the verification code is correctly input comprises comparing whether the position of the touch action of the user on the touch display module is the same as the position of the user-recognizable verification code element in the corresponding sub-region to determine whether the verification code is correctly input.

12. The non-transitory computer-readable medium of claim 11, wherein the instructions cause the processor to display the verification code display region on the touch display module comprises the instructions causing the processor to:
  select an initial verification code region on the touch display module according to a preset parameter;
  divide the initial verification code region into the at least two sub-regions according to a preset rule; and
  store the position of the user-recognizable verification code element in a corresponding sub-region.

13. The non-transitory computer-readable medium of claim 11, wherein the verification code element comprises any one of text, color, and image.

14. The non-transitory computer-readable medium of claim 11, wherein the verification code element comprises any combination of two of text, color, and image.

15. The non-transitory computer-readable medium of claim 11, wherein the verification code element comprises a combination of all three of text, color, and image.

16. The non-transitory computer-readable medium of claim 12, wherein the at least two sub-regions comprise at least two different shapes, and wherein the at least two different shapes comprise at least two of a triangle, a quadrangle, a circle, and a cuboid.

17. The non-transitory computer-readable medium of claim 11, wherein the selection rule comprises semantic representation, pictographic representation, and logical representation correlated with each selected verification code element and a selection order of each verification code element, wherein the semantic representation indicates the selection rule to the user by using a user-readable sentence, wherein the pictographic representation indicates the selection rule to the user by using an image, and wherein the logical representation indicates the selection rule to the user by describing a logical operation to perform to determine the verification code element.

18. The method according to claim 1, further comprising:
  receiving a username and a password; and
  authenticating the user when the username, the password, and the verification code are entered correctly.

19. The apparatus according to claim 6, wherein the computer processor is further configured to execute the computer-executable instructions to:
  receive a username and a password; and
  authenticate the user when the username, the password, and the verification code are entered correctly.

20. The non-transitory computer-readable medium of claim 11, wherein the instructions further cause the processor to:
  receive a username and a password; and
  authenticate the user when the username, the password, and the verification code are entered correctly.

* * * * *

UNITED STATES PATENT AND TRADEMARK OFFICE
CERTIFICATE OF CORRECTION

| | |
|---|---|
| PATENT NO. | : 9,129,100 B2 |
| APPLICATION NO. | : 14/079910 |
| DATED | : September 8, 2015 |
| INVENTOR(S) | : Jiangzhen Zheng and Qian Li |

It is certified that error appears in the above-identified patent and that said Letters Patent is hereby corrected as shown below:

Title Page, item (30) Foreign Application Priority Data section should read:

Dec. 13, 2012  (CN) .................................. 201210538689.4

Signed and Sealed this
Fifteenth Day of March, 2016

Michelle K. Lee
*Director of the United States Patent and Trademark Office*